(12) United States Patent
Yang et al.

(10) Patent No.: US 10,355,289 B2
(45) Date of Patent: Jul. 16, 2019

(54) PLATE STRUCTURE FOR A FUEL CELL

(71) Applicant: GM GLOBAL TECHNOLOGY OPERATIONS LLC, Detroit, MI (US)

(72) Inventors: Xi Yang, Bloomfield Hills, MI (US); Richard D. Blakeley, Ortonville, MI (US); Liang Xi, Madison Heights, MI (US); Siguang Xu, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 176 days.

(21) Appl. No.: 15/425,074

(22) Filed: Feb. 6, 2017

(65) Prior Publication Data

US 2018/0226661 A1 Aug. 9, 2018

(51) Int. Cl.
H01M 8/0271 (2016.01)
H01M 8/0286 (2016.01)
H01M 8/0276 (2016.01)
H01M 8/1018 (2016.01)

(52) U.S. Cl.
CPC ........ H01M 8/0276 (2013.01); H01M 8/0286 (2013.01); H01M 2008/1095 (2013.01); Y02P 70/56 (2015.11)

(58) Field of Classification Search
CPC .................... H01M 8/0271; H01M 8/0286
See application file for complete search history.

(56) References Cited

U.S. PATENT DOCUMENTS

| 4,988,583 | A | * | 1/1991 | Watkins | H01M 8/0228 429/492 |
| 8,371,587 | B2 | | 2/2013 | Fly et al. | |
| 8,603,704 | B2 | | 12/2013 | Keyser et al. | |
| 2009/0197147 | A1 | * | 8/2009 | Fly | H01M 8/0276 429/509 |
| 2010/0086820 | A1 | * | 4/2010 | Owejan | H01M 8/0258 429/514 |
| 2012/0129073 | A1 | * | 5/2012 | Spencer | H01M 8/0247 429/460 |
| 2018/0097242 | A1 | * | 4/2018 | Xu | H01M 8/1004 |
| 2018/0123144 | A1 | * | 5/2018 | Yang | H01M 8/0258 |
| 2018/0131016 | A1 | * | 5/2018 | Yang | H01M 8/0297 |

* cited by examiner

Primary Examiner — Barbara L Gilliam
Assistant Examiner — Adam A Arciero
(74) Attorney, Agent, or Firm — Quinn IP Law

(57) ABSTRACT

A plate structure includes a plate having a planar portion defining a datum plane. The plate includes a raised bead seal and a tunnel protruding away from the datum plane. The raised bead seal extends along a centerline laying on the datum plane. The tunnel extends along a path laying on the datum plane. The tunnel intersects the raised bead seal. The path and the centerline intersect to form a first intersection angle and an adjacent second intersection angle on the datum plane. The first intersection angle and the second intersection angle are supplementary angles. The first intersection angle is an acute angle, and the second intersection angle is an obtuse angle. The path and the centerline are arranged to form a specific value of the first intersection angle and the second intersection angle to control a stiffness of the raised bead seal.

18 Claims, 2 Drawing Sheets

PLATE STRUCTURE FOR A FUEL CELL

INTRODUCTION

The disclosure generally relates to a plate structure having a raised bead seal for sealing against an adjacent plate.

Fuel cells are electrochemical devices which combine a fuel such as hydrogen and an oxidant such as oxygen to produce electricity. The term "fuel cell" is typically used to refer to either a single cell or a plurality of cells depending upon the context in which it is used. The plurality of cells is typically bundled together and arranged to form a stack with the plurality of cells commonly arranged in electrical series.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper. The DM's serve as the primary current collectors for the anode and cathode as well as provide mechanical support for the MEA. The DM's and MEA are pressed between a pair of electronically conductive plates e.g., a monopolar plate or a bipolar plate, which serve as secondary current collectors for collecting the current from the primary current collectors.

Monopolar plates typically include a single thin metal sheet, whereas the bipolar plates typically include two thin, facing metal sheets. The sheets define a flow path on one outer surface thereof for delivery of the fuel to the anode of the MEA, or the oxidant for delivery to the cathode side of the MEA. In the case of a bipolar plate, an outer surface of the other sheet defines a flow path for the other of the fuel to the anode of the MEA, or the oxidant for delivery to the cathode side of the MEA. In the case of bipolar plates, when the sheets are joined, the joined surfaces may define a flow path for a dielectric cooling fluid. The plates are typically produced from a formable metal that provides suitable strength, electrical conductivity, and corrosion resistance.

In order to mitigate against undesirable leakage of fluids from between the plates, a seal is often used. The seal is disposed along a peripheral edge of the plates, and/or around a periphery of an aperture extending through the plates. The seal may include an elastomeric seal, or alternatively, the metal plates may be formed to define a raised bead seal. The raised bead seal may be formed on a planar metal sheet adjacent an outer edge of the sheet, or adjacent an edge surrounding an aperture formed in the sheet. The raised bead seal may be formed in the metal sheet by a stamping operation, although other methods may be used. The raised bead seal may be substantially symmetrical about a longitudinal center line of the raised bead seal. However, it should be appreciated that the raised bead seal may be non-symmetrical about the longitudinal center line. The raised bead seal may include a generally arcuate cross sectional shape perpendicular to the longitudinal center line. The generally arcuate cross sectional shape of the raised bead seal provides an elastic response to a load in a direction normal to the planar metal sheet.

The raised bead seal is compressed against an adjoining plate to form a seal against the adjoining plate. If portions of the raised bead seal have a high stiffness, and others have a lower stiffness, the high stiffness areas of the raised bead seal may prevent the lower stiffness areas of the raised bead seal from forming a tight seal. Accordingly, the raised bead seals should have a uniform stiffness in all sections of the raised bead seal in order to form a tight seal around the entire peripheral edge of the plates and/or around the entire periphery of the adjacent aperture.

SUMMARY

A plate structure for a fuel cell is provided. The plate structure includes a first plate having a planar portion defining a datum plane. A raised bead seal protrudes away from the datum plane, and extends along a centerline laying on the datum plane. A tunnel protrudes away from the datum plane, and extends along a path laying on the datum plane. The tunnel intersects the raised bead seal. The path and the centerline intersect to form a first intersection angle on the datum plane. The first intersection angle is a non-right angle. The path and the centerline are arranged to form a specific value of the first intersection angle to control a stiffness of the raised bead seal.

In one aspect of the plate structure, the path of the tunnel may be linear. In another aspect of the plate structure, the centerline of the raised bead seal may be non-linear.

In one aspect of the plate structure, the first intersection angle is measured between the path and a tangent of the centerline at the intersection of the centerline and the path.

In another aspect of the plate structure, the intersection of the path and the centerline form a second intersection angle on the datum plane. The first intersection angle and the second intersection angle may be supplementary angles. In another aspect of the plate structure, the first intersection angle and the second intersection angle may be adjacent angles.

In yet another aspect of the plate structure, one of the first intersection angle and the second intersection angle is an obtuse angle, and the other of the first intersection angle and the second intersection angle is an acute angle. In one aspect of the plate structure, the acute angle is less than seventy-five degrees.

In one aspect of the plate structure, the raised bead seal exhibits a stiffness that increases with a decrease in the value of the acute angle, and decreases with an increase in the value of the acute angle.

In another aspect of the plate structure, the first plate defines an edge and a port extending through the first plate, with the tunnel being in fluid communication with the edge of the first plate on a first side of the raised bead seal, and in fluid communication with the port on a second side of the raised bead seal.

In another aspect of the plate structure, the plate structure includes a second plate having a planar portion disposed on the datum plane opposite the first planar portion of the first plate. The second plate is attached to the first plate and is a mirror image of the first plate, with the first plate and the second plate forming a bipolar plate.

A bipolar plate structure for a fuel cell is also provided. The bipolar plate structure includes a first plate having a planar portion defining a datum plane, and a second plate having a planar portion disposed on the datum plane opposite the first planar portion of the first plate. A raised bead seal is formed into the first plate, and protrudes away from the datum plane. The raised bead seal extends along a centerline disposed on the datum plane. A tunnel is formed into the first plate, and protrudes away from the datum plane.

The tunnel extends along a path that is disposed on the datum plane. The tunnel intersects the raised bead seal. The path and the centerline intersect to form a first intersection angle and an adjacent second intersection angle on the datum plane. The first intersection angle and the second intersection angle form supplementary angles. The first intersection angle is an acute angle, and the second intersection angle is an obtuse angle.

In one aspect of the bipolar plate structure, the path of the tunnel is linear. In another aspect of the bipolar plate structure, the centerline of the raised bead seal is non-linear. In another aspect of the bipolar plate structure, the first intersection angle is measured between the path and a tangent of the centerline at the intersection of the centerline and the path.

In another aspect of the bipolar plate structure, the acute angle is less than seventy-five degrees. In another aspect of the bipolar plate structure, the raised bead seal exhibits a stiffness. The stiffness of the raised bead seal increases with a decrease in the value of the acute angle. The stiffness of the raised bead seal decreases with an increase in the value of the acute angle.

In another aspect of the bipolar plate structure, the first plate and the second plate are mirror images of each other across the datum plane.

A method of manufacturing a plate structure for a fuel cell is also provided. The method includes forming a first plate to include a raised bead seal. The raised bead seal protrudes away from a datum plane, and extends along a centerline laying on the datum plane. The raised bead seal exhibits a stiffness. The first plate is formed to include a tunnel that protrudes away from the datum plane and extends along a path laying on the datum plane. The tunnel intersects the raised bead seal. The path and the centerline intersect to form a first intersection angle and an adjacent second intersection angle on the datum plane. The first intersection angle and the second intersection angle are supplementary angles. The first intersection angle is an acute angle, and the second intersection angle is an obtuse angle. The relative orientation between the path of the tunnel and the centerline of the raised bead seal is controlled to control a value of the first intersection angle and the second intersection angle respectively. The value of the first intersection angle and the second intersection angle are controlled to affect the stiffness of the raised bead seal, such that the stiffness of the raised bead seal increases with a decrease in the value of the acute angle, and the stiffness of the raised bead seal decreases with an increase in the value of the acute angle.

Accordingly, the relative angle between the raised bead seal and the tunnel is controlled to control the stiffness of the raised bead seal. By doing so, the stiffness of the raised bead seal may be controlled to generally be uniform through all sections of the raised bead seal, thereby providing a tight seal through all sections of the raised bead seal.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the FIGS., and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 3:
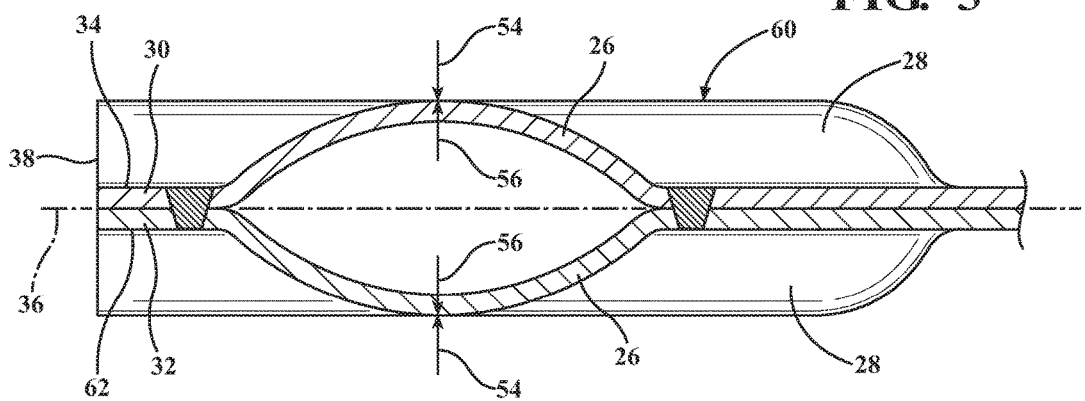
FIG. 3 is a schematic fragmentary cross sectional view of two of the plate structures forming a bipolar plate structure.

Referring to the FIGS., wherein like numerals indicate like parts throughout the several views, a plate structure is generally shown at 20. The plate structure 20 is configured for use in a fuel cell, or fuel cell stack, as is known in the art. For example, the plate structure 20 may be configured as a monopolar plate, or two plate structures 20 may be combined and configured as a bipolar plate, such as shown in FIG. 3. The specifics of the fuel cell are not pertinent to the teachings of this disclosure, and are therefore not described in detail herein.

Figure 1:
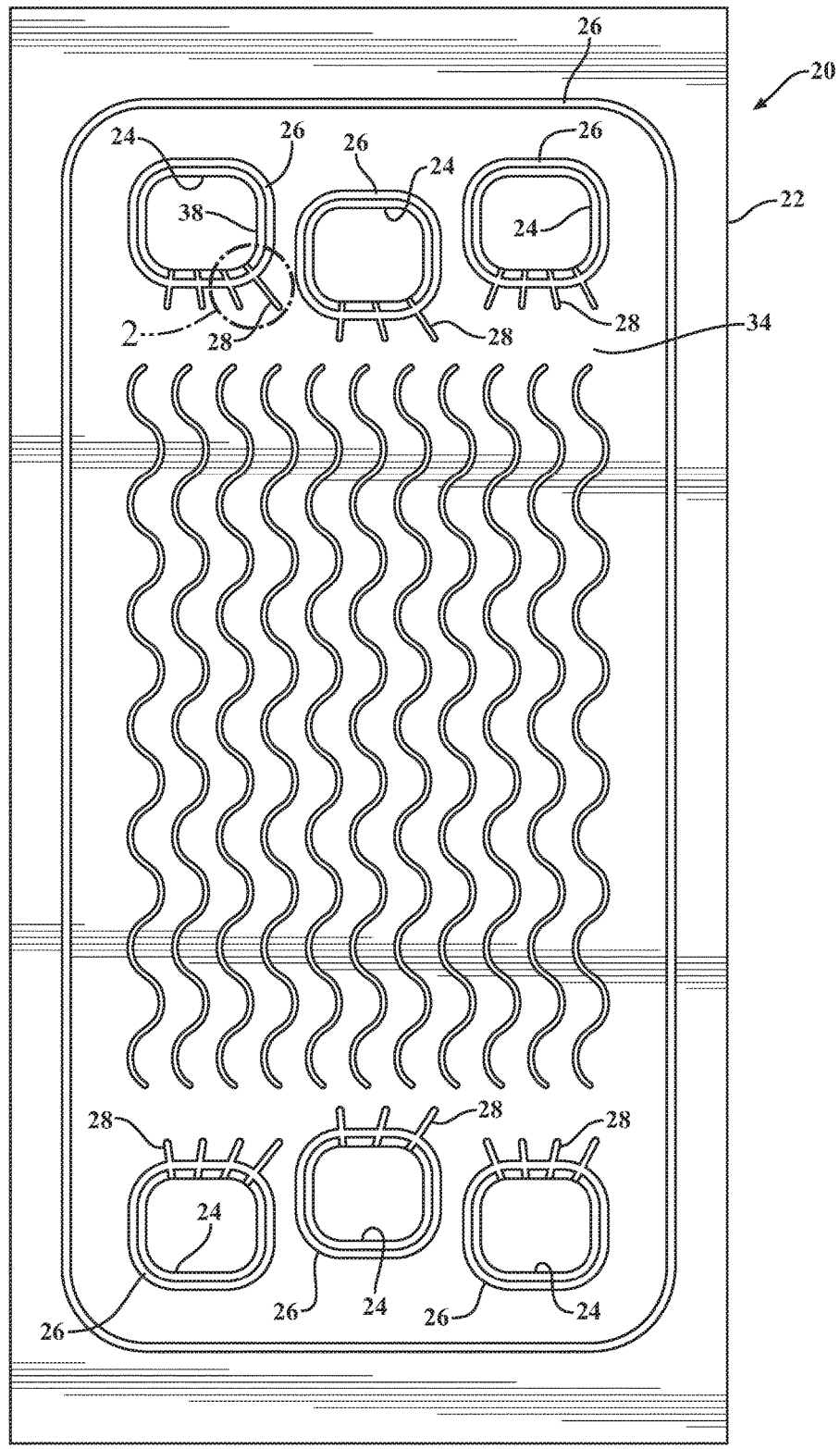
FIG. 1 is a schematic plan view of a plate structure for a fuel cell stack.

Referring to FIG. 1, the plate structure 20 includes an outer peripheral edge 22, and defines a plurality of apertures 24 extending through the plate structure 20. A raised bead seal 26 is disposed adjacent a periphery of at least one of the apertures 24. An additional raised bead seal 26 is also disposed adjacent the outer peripheral edge 22 of the plate structure 20. A tunnel 28 extends from the periphery of the aperture 24, across the raised bead seal 26. The intersection between the raised bead seal 26 and the tunnel 28 shown in FIG. 1 is described in greater detail below, with reference to FIGS. 2 and 3.

The plate structure 20 includes at least one plate. If the plate structure 20 is configured as a monopolar plate structure 20, then the plate structure 20 only includes a first plate 30. If the plate structure 20 is configured as a bipolar plate structure 60, such as shown in FIG. 3, then the plate structure 20 includes the first plate 30 and a second plate 32.

Figure 2:
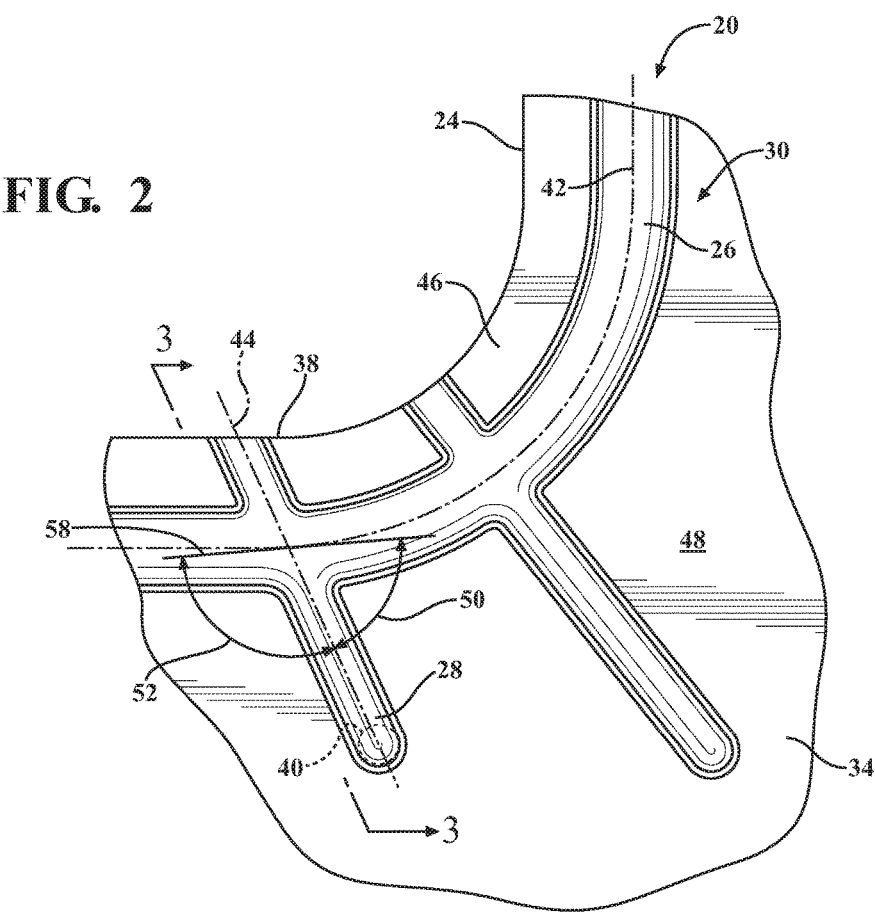
FIG. 2 is a schematic fragmentary plan view of the plate structure showing a tunnel and a raised bead seal adjacent an aperture in the plate structure.

Referring to FIG. 3, the first plate 30 includes a planar portion 34 that defines a datum plane 36. The datum plane 36 may include, for example, an exterior surface of the planar portion 34. Referring to FIG. 2, and as noted above, the first plate 30 defines an aperture 24 that extends through the first plate 30. The first plate 30 forms and edge 38 of the aperture 24. The first plate 30 further includes a port 40, extending through the first plate 30. The aperture 24 and the port 40 may be disposed in fluid communication with other components of the fuel cell, as is known in the art.

The raised bead seal 26 is laterally spaced from the edge 38 of the aperture 24, and generally extends around the aperture 24. The raised bead seal 26 protrudes away from the datum plane 36, and extends along a centerline 42 that is disposed on the datum plane 36. The centerline 42 forms an endless loop about the aperture 24. The raised bead seal 26 may be formed on the first plate 30 and/or the second plate 32. The raised bead seal 26 may be formed in the metal sheet by a stamping operation, although other methods may be used. The raised bead seal 26 may be substantially symmetrical about a longitudinal centerline 42 of the raised bead seal 26. However, it should be appreciated that the raised bead seal 26 may be non-symmetrical about the longitudinal centerline 42. The raised bead seal 26 may include a generally arcuate cross sectional shape perpendicular to the longitudinal centerline 42. The generally arcuate cross sectional shape of the raised bead seal 26 provides an elastic response to a load in a direction normal to the plate structure 20. The raised bead seal 26 may include any desirable cross sectional shape. For example, the raised bead seal 26 may include a semi-circular shape that protrudes from the planar portion 34 of the first plate 30.

As shown in FIG. 1, the exemplary embodiment of the raised bead seal 26 is non-linear. However, other embodiments of the raised bead seal 26 may be linear. As shown in the example embodiment, the entirety of the centerline 42 of the raised bead seal 26 may be considered non-linear. However, it should be appreciated that portions of the centerline 42 shown in the exemplary embodiment may be considered linear. Accordingly, the centerline 42 may be comprised of linear portions and non-linear portions. The non-linear portions may be considered curved portions having a defined curvature.

The tunnel 28 protrudes away from the datum plane 36, and extends along a path 44 disposed on the datum plane 36. The path 44 of the tunnel 28 is linear. As such, the tunnel 28 extends in a straight line, and does not deviate left or right from the straight, linear line defined by the path 44 of the tunnel 28. The tunnel 28 intersects the raised bead seal 26. The tunnel 28 may include any desirable cross sectional shape. For example, the tunnel 28 may include a semi-circular shape that protrudes from the planar portion 34 of the first plate 30. The tunnel 28 is disposed in fluid communication with the edge 38 of the first plate 30, which is located on a first side 46 of the raised bead seal 26. More specifically, the tunnel 28 is in fluid communication with the edge 38 of the first plate 30 that defines the aperture 24, and as such, the tunnel 28 is in fluid communication with the aperture 24. The tunnel 28 is also disposed in fluid communication with the port 40, which is located on a second side 48 of the raised bead seal 26. As noted above, the path 44 of the tunnel 28 is linear and extends along a straight line. As such, the path 44 extends from the first side 46 of the raised bead seal 26, along the straight line defined by the linear path 44, across the bead seal to the second side 48 of the bead seal, such that the portion of the tunnel 28 on the first side 46 of the raised bead seal 26 is aligned with the portion of the tunnel 28 on the second side 48 of the raised bead seal 26 on the straight, linear path 44.

The path 44 of the tunnel 28 and the centerline 42 of the raised bead seal 26 intersect to form a first intersection angle 50 and a second intersection angle 52 on the datum plane 36. The first intersection angle 50 and the second intersection angle 52 are adjacent angles. In other words, the first intersection angle 50 and the second intersection angle 52 are disposed directly next to each other, and include at least one ray or side in common. Furthermore, the first intersection angle 50 and the second intersection angle 52 are supplementary angles. As such, the sum of the first intersection angle 50 and the second intersection angle 52 is equal to one hundred eighty degrees (180°).

One of the first intersection angle 50 and the second intersection angle 52 is an obtuse angle, and the other of the first intersection angle 50 and the second intersection angle 52 is an acute angle. As shown in FIG. 2, the exemplary embodiment of the plate structure 20 defines the first intersection angle 50 as the acute angle, i.e., an angle less than ninety degrees (90°), and the second intersection angle 52 as the obtuse angle, i.e., an angle greater than ninety degrees (90°).

The raised bead seal 26 exhibits a stiffness. As used herein, the term "stiffness" may be defined as the extent or amount of resistance against deformation in response to an applied force 54 (shown in FIG. 3) directed normal to the datum plane 36. The stiffness of the raised bead seal 26 increases with a decrease in the value of the acute angle. In contrast, the stiffness of the raised bead seal 26 decreases with an increase in the value of the acute angle.

In order to achieve a good seal, the raised bead seal 26 must respond to the applied force 54 by providing a resultant seal force 56 (shown in FIG. 3) that is uniformly distributed along the entire length of the raised bead seal 26. If one section of the raised bead seal 26 has a higher stiffness than another section of the raised bead seal 26, then the higher stiffness section of the raised bead seal 26 will provide a higher seal force, while the lower stiffness section of the raised bead seal 26 will provide a lower seal force. Accordingly, it is important to make the stiffness of the raised bead seal 26 as uniform as possible along the entire length of the raised bead seal 26, in order to provide a consistent seal force along the entire length of the raised bead seal 26.

As noted above, both the raised bead seal 26 and the tunnel 28 protrude upward from the planar portion 34 of the first plate 30, and intersect each other. It should be appreciated that the stiffness of the raised bead seal 26 is at least partially dependent upon the cross sectional shape and/or structure of the raised bead seal 26. However, in the region of the raised bead seal 26 that is intersected by the tunnel 28, the cross sectional shape of the raised bead seal 26 is altered. In essences, the side walls of the raised bead seal 26 are removed where the tunnel 28 intersects the raised bead seal 26, thereby weakening the raised bead seal 26 and lessening the stiffness of the raised bead seal 26 at the middle of the intersection. However, the geometric structure that is formed where the sidewalls of the raised bead seal 26 and the tunnel 28 connect may exhibit a higher stiffness than the cross sectional stiffness of the raised bead seal 26 alone provides. Accordingly, the local corners or four quadrants formed by the intersection of the tunnel 28 and the raised bead seal 26 may exhibit a higher stiffness than that of other sections of the raised bead seal 26, whereas the center of the intersection between the tunnel 28 and the raised bead seal 26, near the intersection of the path 44 and the centerline 42, may exhibit a lower stiffness than other sections of the raised bead seal 26. By angling the path 44 of the tunnel 28 relative to the centerline 42 of the raised bead seal 26, the stiffness of the raised bead seal 26 is made more uniform throughout the region of the intersection between the tunnel 28 and the raised bead section.

As noted above, the exemplary embodiment of the plate structure 20 shown in the FIGS. shows the first intersection angle 50 is an acute angle. As such, the first intersection angle 50 is a non-right angle having a value that is less than ninety degrees (90°), and the second intersection angle 52 is a non-right angle having a value that is greater than ninety degrees (90°). If the intersection between the tunnel 28 and the raised bead seal 26 occurs within a curved section of the centerline 42, then the first intersection angle 50 is measured between the path 44 and a tangent 58 of the centerline 42 at the intersection of the centerline 42 and the path 44.

The values of the first intersection angle 50 and the second intersection angle 52 depend upon the geometry of the first plate 30, including but not limited to the location of the raised bead seal 26 to the edge 38 of the aperture 24, the location of the port 40, etc. Generally, the lowest possible value of the acute angle will provide the most uniformity for the stiffness of the raised bead seal 26. However, as noted above, the geometry of the plate structure 20 may limit the amount that the path 44 of the tunnel 28 may be angled relative to the centerline 42 of the raised bead seal 26. Preferably, the acute angle is less than seventy-five degrees (75°). More preferably, the acute angle is less than forty-five degrees (45°). However, in some embodiments, this may not be achievable. Accordingly, it should be appreciated that any decrease in the acute angle, to a value less than ninety degrees (90°) should provide improvements to the uniformity of the stiffness in the raised bead seal 26.

As noted above, the plate structure 20 may be configured as a bipolar plate structure 60, in which two plates are combined and joined together as is known in the art. Referring to FIG. 3, an example of the bipolar plate structure 60 is shown. The second plate 32 includes a planar portion 62 that is disposed on the datum plane 36 opposite the first planar portion 34 of the first plate 30. The second plate 32 is attached to the first plate 30 and is a mirror image of the first plate 30 across the datum plate, with the first plate 30 and the second plate 32 forming the bipolar plate structure 60. Accordingly, it should be appreciated that the second plate 32 is shaped and/or formed to include the raised bead seal 26 and the tunnel 28 as described above with reference to the first plate 30, in which the path 44 of the tunnel 28 is angled relative to the centerline 42 of the raised bead seal 26.

A method of manufacturing the plate structure 20 is also provided. The method includes forming the first plate 30 to include the raised bead seal 26, which protrudes away from the datum plane 36, and extends along the centerline 42 laying on the datum plane 36. The first plate 30 is further or simultaneously formed to include the tunnel 28. As described above, the tunnel 28 also protrudes away from the datum plane 36 and extends along the path 44 laying on the datum plane 36. The first plate 30, including the raised bead seal 26 and the tunnel 28, may be formed in any suitable manner. For example, the first plate 30 may be formed from a thin metal sheet, with a stamping or other similar process, known to those skilled in the art.

As described above, the relative orientation between the path 44 of the tunnel 28 and the centerline 42 of the raised bead seal 26 affects the stiffness of the raised bead seal 26 at the intersection between the tunnel 28 and the raised bead seal 26. Accordingly, the relative orientation between the path 44 of the tunnel 28 and the centerline 42 of the raised bead seal 26 is designed to control a value of the first intersection angle 50 and the second intersection angle 52, to affect the stiffness of the raised bead seal 26. As noted above, the stiffness of the raised bead seal 26 increases with a decrease in the value of the acute angle, and the stiffness of the raised bead seal 26 decreases with an increase in the value of the acute angle.

The detailed description and the drawings or FIGS. are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of manufacturing a plate structure for a fuel cell, the method comprising:
   forming a first plate to include a raised bead seal that protrudes away from a datum plane, and extends along a centerline laying on the datum plane, with the raised bead seal exhibiting a stiffness;
   forming the first plate to include a tunnel that protrudes away from the datum plane and extends along a path laying on the datum plane, with the tunnel intersecting the raised bead seal;
   wherein the path and the centerline intersect to form a first intersection angle and an adjacent second intersection angle on the datum plane, with the first intersection angle and the second intersection angle supplementary angles;
   wherein the first intersection angle is an acute angle having a value less than seventy five degrees, and the second intersection angle is an obtuse angle; and
   wherein the relative orientation between the path of the tunnel and the centerline of the raised bead seal controls a value of the first intersection angle and the second intersection angle, to affect the stiffness of the raised bead seal, such that the stiffness of the raised bead seal increases with a decrease in the value of the acute angle, and the stiffness of the raised bead seal decreases with an increase in the value of the acute angle.

2. A plate structure for a fuel cell, the plate structure comprising:
   a first plate having a planar portion defining a datum plane;
   a raised bead seal protruding away from the datum plane, and extending along a centerline disposed on the datum plane;
   a tunnel protruding away from the datum plane, and extending along a path disposed on the datum plane, wherein the tunnel intersects the raised bead seal;
   wherein the path and the centerline intersect to form a first intersection angle on the datum plane;
   wherein the first intersection angle is a non-right angle; and
   wherein the first plate defines an edge and a port extending through the first plate, and wherein the tunnel is in fluid communication with the edge of the first plate on a first side of the raised bead seal, and in fluid communication with the port on a second side of the raised bead seal.

3. The plate structure set forth in claim 2, wherein the path of the tunnel is linear.

4. The plate structure set forth in claim 3, wherein the centerline of the raised bead seal is non-linear.

5. The plate structure set forth in claim 4, wherein the first intersection angle is measured between the path and a tangent of the centerline at the intersection of the centerline and the path.

6. The plate structure set forth in claim 2, wherein the intersection of the path and the centerline form a second intersection angle on the datum plane.

7. The plate structure set forth in claim 6, wherein the first intersection angle and the second intersection angle are supplementary angles.

8. The plate structure set forth in claim 7, wherein the first intersection angle and the second intersection angle are adjacent angles.

9. The plate structure set forth in claim 8, wherein one of the first intersection angle and the second intersection angle is an obtuse angle, and the other of the first intersection angle and the second intersection angle is an acute angle.

10. The plate structure set forth in claim 9, wherein the acute angle is less than seventy-five degrees.

11. The plate structure set forth in claim 9, wherein the raised bead seal exhibits a stiffness, and wherein the stiffness of the raised bead seal increases with a decrease in the value of the acute angle, and the stiffness of the raised bead seal decreases with an increase in the value of the acute angle.

12. The plate structure set forth in claim 2, further comprising a second plate having a planar portion disposed on the datum plane opposite the first planar portion of the first plate, wherein the second plate is attached to the first plate and is a mirror image of the first plate, with the first plate and the second plate forming a bipolar plate.

13. A bipolar plate structure for a fuel cell, the bipolar plate structure comprising:
   a first plate having a planar portion defining a datum plane;
   a second plate having a planar portion disposed on the datum plane opposite the first planar portion of the first plate;
   a raised bead seal formed into the first plate and protruding away from the datum plane, the raised bead seal extending along a centerline disposed on the datum plane;
   a tunnel formed into the first plate and protruding away from the datum plane, the tunnel extending along a path disposed on the datum plane, wherein the tunnel intersects the raised bead seal;
   wherein the path and the centerline intersect to form a first intersection angle and an adjacent second intersection angle on the datum plane, with the first intersection angle and the second intersection angle forming supplementary angles; and
   wherein the first intersection angle is an acute angle having a value less than seventy-five degrees, and the second intersection angle is an obtuse angle.

14. The bipolar plate structure set forth in claim 13, wherein the path of the tunnel is linear.

15. The bipolar plate structure set forth in claim 14, wherein the centerline of the raised bead seal is non-linear.

16. The bipolar plate structure set forth in claim 15, wherein the first intersection angle is measured between the path and a tangent of the centerline at the intersection of the centerline and the path.

17. The bipolar plate structure set forth in claim 13, wherein the raised bead seal exhibits a stiffness, and wherein the stiffness of the raised bead seal increases with a decrease in the value of the acute angle, and the stiffness of the raised bead seal decreases with an increase in the value of the acute angle.

18. The bipolar plate structure set forth in claim 13, wherein the first plate and the second plate are mirror images of each other across the datum plane.

* * * * *